(12) United States Patent
Takizawa et al.

(10) Patent No.: US 9,150,712 B2
(45) Date of Patent: Oct. 6, 2015

(54) RUBBER COMPOSITION FOR TIRE TREAD

(71) Applicant: The Yokohama Rubber Company, Limited, Tokyo (JP)

(72) Inventors: Youichi Takizawa, Hiratsuka (JP); Naoki Kushida, Hiratsuka (JP)

(73) Assignee: The Yokohama Rubber Company, Limited, Tokyo (JP)

( * ) Notice: Subject to any disclaimer, the term of this patent is extended or adjusted under 35 U.S.C. 154(b) by 0 days.

(21) Appl. No.: 13/788,633

(22) Filed: Mar. 7, 2013

(65) Prior Publication Data

US 2013/0237653 A1  Sep. 12, 2013

(30) Foreign Application Priority Data

Mar. 8, 2012  (JP) ................... 2012-051957
Nov. 15, 2012  (JP) ................... 2012-251551

(51) Int. Cl.
| | |
|---|---|
| C08L 9/00 | (2006.01) |
| C08L 9/06 | (2006.01) |
| C08K 3/36 | (2006.01) |
| C08L 57/02 | (2006.01) |
| C08K 5/5419 | (2006.01) |
| B60C 1/00 | (2006.01) |

(52) U.S. Cl.
CPC .............. C08K 5/5419 (2013.01); B60C 1/0016 (2013.01); C08L 9/06 (2013.01)

(58) Field of Classification Search
CPC .............. C08L 9/06; C08L 57/02; C08K 3/36; C08K 5/5419; B60C 1/0016
USPC .......... 523/158, 313; 524/492–495, 525, 261, 524/262, 575.5, 267, 572–575
See application file for complete search history.

(56) References Cited

U.S. PATENT DOCUMENTS

| | | | | |
|---|---|---|---|---|
| 6,180,710 | B1 * | 1/2001 | Hergenrother et al. | 524/494 |
| 7,342,070 | B2 * | 3/2008 | Tsukimawashi et al. | 525/105 |
| 2006/0094831 | A1 | 5/2006 | Kazuhiro | |
| 2011/0144236 | A1 * | 6/2011 | Mihara | 523/158 |
| 2011/0294936 | A1 * | 12/2011 | Sato | 524/315 |
| 2011/0301280 | A1 * | 12/2011 | Kushida | 524/525 |
| 2012/0077902 | A1 * | 3/2012 | Steiner et al. | 523/157 |

FOREIGN PATENT DOCUMENTS

| | | | |
|---|---|---|---|
| JP | 2005008804 | A2 | 1/2005 |
| JP | 2007092086 | A2 | 4/2007 |
| JP | 2007-321046 | | 12/2007 |
| JP | 2011032402 | A2 | 2/2011 |
| JP | 2011-079880 | * | 4/2011 |
| KR | 2009-070850 | * | 12/2007 |
| WO | 2011158509 | A1 | 12/2011 |

* cited by examiner

*Primary Examiner* — Angela C Scott

(74) *Attorney, Agent, or Firm* — Rankin, Hill & Clark LLP

(57) ABSTRACT

A rubber composition for a tire tread contains styrene-butadiene rubber in a compounding amount of 100 parts by weight, silica in a compounding amount of 90 to 170 parts by weight, and an aromatic modified terpene resin in a compounding amount of 10 to 30 parts by weight. The styrene-butadiene rubber contains 40 to 100% by weight of solution-polymerized styrene-butadiene rubber (S-SBR1) and 60 to 0% by weight of solution-polymerized styrene-butadiene rubber (S-SBR2), the total content thereof being 100% by weight. The S-SBR1 has a styrene content of 30 to 38% by weight and a vinyl content of 60 to 80% by weight, the total content thereof being 100% by weight, a glass transition temperature of −20 to −5° C., and a weight average molecular weight of 1,000,000 to 1,800,000.

20 Claims, No Drawings

RUBBER COMPOSITION FOR TIRE TREAD

CROSS-REFERENCE TO RELATED APPLICATION

This application is based on Japanese Patent Application Nos. 2012-051957 filed with the Japan Patent Office on Mar. 8, 2012, and 2012-251551 filed with the Japan Patent Office on Nov. 15, 2012, the entire contents of which are hereby incorporated by reference.

BACKGROUND

1. Technical Field

The present disclosure relates to a rubber composition for a tire tread, and more specifically to a rubber composition for a tire tread that provides a pneumatic tire having excellent wet grip performance, steering stability, and abrasion resistance.

2. Related Art

A pneumatic tire for a high-performance vehicle (hereinafter simply referred to as "tire") is required to have many performances. Further, examples of the performances include excellent steering stability during high-speed traveling, stability (wet performance) on a wet road surface, and abrasion resistance. In addition, when a vehicle travels at a high speed on the expressway (e.g., autobahn), a circuit or the like for a long period of time, further performance is required for a tire. For example, suppression of change of tire performance is required for a tire. Specifically, a tire is required to suppress a so-called worn tire which exhibits a state of wear of tire surface. Further, a tire is also required to suppress so-called degeneration due to heating in which the steering stability deteriorates by generating heat from the traveling tire rubber. For example, a competitive tire for travel on a wet road surface is required to have excellent wet performance, that is, to have not only excellent wet performance and grip performance, but also to suppress the generation of worn tire and degeneration due to heating when the tire travels at a high speed for a long period of time. Therefore, heretofore, a rubber composition constituting a pneumatic tire, particularly a tread unit thereof for ground contact (hereinafter referred to as a "rubber composition for a tread" or simply referred to as a "rubber composition") has been intensively researched and developed.

JP-A-2007-321046 discloses a rubber composition for improving the grip performance of a tire in a semiwet state. This rubber composition contains styrene-butadiene copolymer rubber (SBR) having a glass transition temperature (Tg) in a predetermined range. That is, the rubber composition contains 100 parts by weight of styrene-butadiene copolymer rubber (SBR) including any one of single SBR having a glass transition temperature (Tg) of −30 to 0° C. or a blend obtained by mixing two or more kinds of SBR and having an average Tg of −30 to 0° C.; 80 to 180 parts by weight of a filler containing 50 parts by weight or more of silica; and 5 to 60 parts by weight of a resin having a softening point of 100 to 150° C. However, only adjustment of the Tg of the SBR does not necessarily sufficiently satisfy the requirements of users for the wet grip performance, steering stability, and abrasion resistance of a tire.

The present disclosure has been made in view of the problems of conventional techniques. An object of the present disclosure is to provide a rubber composition to be used for a tire tread having excellent wet grip performance, steering stability, and abrasion resistance as compared with a conventional rubber composition.

SUMMARY

A rubber composition for a tire tread according to one aspect of the present disclosure contains:
styrene-butadiene rubber in a compounding amount of 100 parts by weight,
silica in a compounding amount of 90 to 170 parts by weight, and
an aromatic modified terpene resin in a compounding amount of 10 to 30 parts by weight,
wherein the styrene-butadiene rubber contains 40 to 100% by weight of solution-polymerized styrene-butadiene rubber (S-SBR1) and 60 to 0% by weight of solution-polymerized styrene-butadiene rubber (S-SBR2), the total content thereof being 100% by weight,
the S-SBR1 has a styrene content of 30 to 38% by weight and a vinyl content of 60 to 80% by weight, the total content thereof being 100% by weight, a glass transition temperature of −20 to −5° C., and a weight average molecular weight of 1,000,000 to 1,800,000, and
the S-SBR2 has a glass transition temperature of −30° C. or higher and lower than −20° C., and a weight average molecular weight of 1,000,000 to 1,800,000.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details.

Hereinafter, an embodiment of the present disclosure will be described in detail.

In a rubber composition according to the present embodiment, 0.2 to 5 parts by weight of a cyclic polysulfide represented by the following formula (I) is preferably compounded based on 100 parts by weight of the styrene butadiene rubber:

[Chemical Formula 1]

(I)

wherein R is a substituted or unsubstituted alkylene group having 4 to 8 carbon atoms, or a substituted or unsubstituted oxyalkylene group having 4 to 8 carbon atoms; x is 3 to 5 on the average; and n is an integer of 1 to 5.

The grip performance of a tire using a rubber composition compounded with such a cyclic polysulfide can be improved and be maintained over a period of time. As a result, the state of wear of tire surface (worn tire) is kept favorably and uneven wear is suppressed. In other words, the present rubber composition has high rubber hardness and rigidity as compared with a conventional rubber composition. For this reason, the abrasion resistance of the rubber composition can be further improved, and accordingly, the wet grip performance, steering stability, and abrasion resistance of a tire using the rubber composition are further improved.

The rubber composition of the present embodiment preferably contains 2 to 20% by weight of a silane coupling agent and 0.1 to 20% by weight of an alkyltriethoxysilane having an alkyl group with 7 to 20 carbon atoms based on the amount of the silica compounded. Thus, an increase in viscosity of the rubber composition can be suppressed. As a result, the processability of the rubber composition can be further improved.

When the rubber composition is used for a tread unit of a tire, the wet grip performance, steering stability, and abrasion resistance can be improved as compared with a conventional rubber composition.

In the rubber composition for a tire tread of the present disclosure, the rubber component is styrene-butadiene rubber. That is, this styrene-butadiene rubber contains solution-polymerized styrene-butadiene rubber having a high molecular weight and a high glass transition temperature (hereinafter referred to as "S-SBR1") and solution-polymerized styrene-butadiene rubber having a high molecular weight and a glass transition temperature lower than S-SBR1 (hereinafter referred to as "S-SBR2"). That is, the rubber composition contains 40 to 100% by weight of the S-SBR1 and 60 to 0% by weight of the S-SBR2, and the total content thereof is 100% by weight.

The S-SBR1 is solution-polymerized styrene-butadiene rubber having a styrene content of 30 to 38% by weight and a vinyl content of 60 to 80% by weight, the total content thereof being 100% by weight. Further, the glass transition temperature (hereinafter referred to as "Tg") of the S-SBR1 falls within a range of −20 to −5° C., and the weight average molecular weight (hereinafter referred to as "Mw") thereof falls within a range of 1,000,000 to 1,800,000.

More specifically, the styrene content of the S-SBR1 is 30 to 38% by weight, and preferably 32 to 37% by weight. When the styrene content of the S-SBR1 is less than 30% by weight, the rubber strength and wet grip performance of a rubber composition containing the S-SBR1 are reduced. When the styrene content of the S-SBR1 exceeds 38% by weight, the abrasion resistance of the rubber composition containing the S-SBR1 is reduced. The styrene content of the S-SBR1 is measured by the infrared spectroscopic analysis (Hampton technique) well known to those skilled in the art.

The vinyl content of the S-SBR1 is 60 to 80% by weight, and preferably 62 to 70% by weight. When the vinyl content of the S-SBR1 is less than 60% by weight, the wet grip performance of the rubber composition containing the S-SBR1 is reduced. When the vinyl content of the S-SBR1 exceeds 80% by weight, the rubber composition containing the S-SBR1 is too hard, and therefore the wet grip performance thereof is reduced. The vinyl content of the S-SBR1 is measured by the infrared spectroscopic analysis (Hampton technique) well known to those skilled in the art.

The Tg of the S-SBR1 is −20 to −5° C., and preferably −18 to −7° C. When the Tg of the S-SBR1 is lower than −20° C., the wet grip performance of a tire produced by using the rubber composition containing the S-SBR1 is reduced. When the Tg of the S-SBR1 is higher than −5° C., the abrasion resistance of the rubber composition containing the S-SBR1, in other words, the abrasion resistance of a tire produced by using the rubber composition containing the S-SBR1 is reduced. Each Tg of the S-SBR1 and S-SBR2 used herein is a temperature at the midpoint of transition range obtained from a thermogram measured at a temperature increasing rate of 20° C./minute by the differential scanning calorimetry (DSC). When the S-SBR1 and the S-SBR2 are each oil-extended products, the Tg of the S-SBR1 is the glass transition temperature of the S-SBR1, and the Tg of the S-SBR2 is the glass transition temperature of the S-SBR2, both of which do not contain an oil-extended component (oil).

The molecular weight (Mw) of the S-SBR1 is 1,000,000 to 1,800,000, and preferably 1,200,000 to 1,600,000. When the Mw of the S-SBR1 is less than 1,000,000, the rubber strength of the rubber composition containing the S-SBR1 is reduced. When the Mw exceeds 1,800,000, the processability of the rubber composition deteriorates. The Mws of the S-SBR1 and S-SBR2 used herein are determined by gel permeation chromatography (GPC) in terms of standard polystyrene.

The content of the S-SBR1 in 100% by weight of the styrene-butadiene rubber is 40 to 100% by weight, preferably 70 to 100% by weight, more preferably more than 70% by weight to 100% by weight or less, and further preferably 75 to 100% by weight. When the content of the S-SBR1 is less than 40% by weight, the rubber hardness of the rubber composition containing the S-SBR1 is reduced. As a result, tan δ (0° C.) of the rubber composition is decreased, and therefore the wet grip performance is reduced. Further, the steering stability of a tire having a tread made of the rubber composition is reduced. Herein, tan δ is the loss tangent of a rubber composition, which is determined by a test well known to those skilled in the art, as described below. Tan δ (0° C.) is an index of wet performance, and tan δ (60° C.) is an index of exothermic property, in other words, of low fuel consumption.

Next, the S-SBR2 contained in the rubber composition of the present disclosure is a solution-polymerized styrene-butadiene rubber, and the S-SBR2 has a Tg of −30° C. or higher and lower than −20° C. and an Mw of 1,000,000 and 1,800,000.

More specifically, the Tg of the S-SBR2 is −30° C. or higher and lower than −20° C., and preferably −28 to −22° C. When the Tg of the S-SBR2 is lower than −30° C., the wet grip performance of a tire using a rubber composition containing the S-SBR2 is reduced. When the Tg of the S-SBR2 is higher than −20° C., the abrasion resistance of a tire using the rubber composition containing the S-SBR2 is reduced.

The Mw of the S-SBR2 is 1,000,000 to 1,800,000, and preferably 1,100,000 to 1,500,000. When the Mw of the S-SBR2 is less than 1,000,000, the rubber strength of the rubber composition containing the S-SBR2 is reduced. When the Mw of the S-SBR2 exceeds 1,800,000, the processability of the rubber composition deteriorates.

The content of the S-SBR2 in 100% by weight of the styrene-butadiene rubber is 60 to 0% by weight, preferably 30 to 0% by weight, more preferably less than 30% by weight, and further preferably 25 to 0% by weight. When the content of the S-SBR2 is more than 60% by weight, the rubber hardness of the rubber composition containing the S-SBR2 is reduced. As a result, loss tangent tan δ (0° C.) of the rubber composition is decreased, and therefore the wet grip performance is reduced. Further, the steering stability of a vehicle with a tire having a tread made of the rubber composition is reduced. The S-SBR2 is an optional component, and the styrene-butadiene rubber may be made of only the S-SBR1 described above.

The rubber composition for a tire tread of the present disclosure further contains an aromatic modified terpene resin. The aromatic modified terpene resin contributes to an improvement in the steering stability and the wet performance. The amount of the aromatic modified terpene resin compounded is 10 to 30 parts by weight, and preferably 12 to 25 parts by weight, based on 100 parts by weight of the styrene-butadiene rubber. When the amount of the aromatic modified terpene resin compounded is less than 10 parts by weight, the steering stability and the wet grip performance cannot be increased sufficiently. When the amount of the aromatic modified terpene resin compounded exceeds 30 parts by weight, the tackiness of the rubber composition is increased. As a result, molding processability and handleability are reduced, for example, the rubber composition adheres to a molding roller.

The aromatic modified terpene resin is obtained by polymerizing terpene and an aromatic compound. Examples of the terpene include α-pinene, β-pinene, dipentene, and limonene. Examples of the aromatic component include styrene, α-methylstyrene, vinyltoluene, and indene. The aromatic modified terpene resin is preferably a styrene-modified terpene resin. Since such an aromatic modified terpene resin has good compatibility with diene-based rubber, the tan δ at 0° C. (described below) of the rubber composition is increased, and the wet grip performance is improved.

More specifically, an aromatic modified terpene resin having a softening point of preferably 80° C. or higher and lower than 100° C., and more preferably 80 to 95° C. is used as the aromatic modified terpene resin. When the softening point of the aromatic modified terpene resin is lower than 80° C., an effect of improving the wet performance of the rubber composition is not sufficiently obtained. When the softening point of the aromatic modified terpene resin is 100° C. or higher, the abrasion resistance of the rubber composition tends to be reduced. The softening point of the aromatic modified terpene resin is measured in accordance with JIS K6220-1 (ring and ball method).

The aromatic modified terpene resin preferably has a hydroxyl value of 30 KOH mg/g or less, and more preferably 0 to 25 KOH mg/g. When the hydroxyl value of the aromatic modified terpene resin is 30 KOH mg/g or less, the tan δ at 0° C. of the rubber composition is increased, and the wet grip performance thereof is improved. The hydroxyl value of the aromatic modified terpene resin is measured in accordance with JIS K1557-1.

The rubber composition for a tire tread of the present disclosure preferably contains a cyclic polysulfide represented by the following formula (I). For this reason, the rubber composition can suppress a worn tire. Further, the rubber composition has high rubber hardness and rigidity as compared with a conventional rubber composition. Therefore, the rubber composition has improved abrasion resistance. In other words, the rubber composition has improved abrasion resistance and can improve the steering stability of a tire during traveling at a high speed.

[Chemical Formula 2]

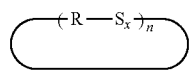

(I)

In the formula (I), R is a substituted or unsubstituted alkylene group having 4 to 8 carbon atoms, or a substituted or unsubstituted oxyalkylene group having 4 to 8 carbon atoms, x is 3 to 5 on the average, and n is an integer of 1 to 5.

In the cyclic polysulfide represented by the formula (I), R is an alkylene group or an oxyalkylene group, in which the number of carbon atoms is preferably 4 to 8, and more preferably 4 to 7. Examples of substituents to the alkylene group and the oxyalkylene group include a phenyl group, a benzyl group, a methyl group, an epoxy group, an isocyanate group, a vinyl group, and a silyl group. S represents sulfur. x is preferably 3 to 5 on the average, and more preferably 3.5 to 4.5 on the average. n is preferably an integer of 1 to 5, and more preferably 1 to 4. Such a cyclic polysulfide can be produced by a method well known to those skilled in the art. An example of such a production method includes the method described in JP-A-2007-92086.

In the present disclosure, the amount of the cyclic polysulfide compounded is 0.2 to 5 parts by weight, and preferably 1 to 4 parts by weight, based on 100 parts by weight of the diene-based rubber. When the amount of the cyclic polysulfide compounded is less than 0.2 part by weight, the grip performance of a tire using the present rubber composition cannot be kept to a high level over a period of time, and the blowout resistance of the tire cannot be improved. In addition, a reduction in abrasion resistance of the tire cannot be sufficiently suppressed. When the amount of the cyclic polysulfide compounded exceeds 5 parts by weight, the processability of the rubber composition is reduced.

In the present rubber composition, the cyclic polysulfide represented by the formula (I) acts as a vulcanizing agent. As a vulcanizing agent, the cyclic polysulfide may be used alone or in combination with another vulcanizing agent. The other vulcanizing agent is preferably sulfur. The amount of sulfur compounded is 0.1 to 5 parts by weight, and preferably 0.5 to 4 parts by weight, based on 100% by weight of the diene-based rubber. When sulfur is compounded in the cyclic polysulfide, the weight ratio (cyclic polysulfide/sulfur) of the cyclic polysulfide to sulfur is preferably 1/5 to 10/1, and more preferably 1/4 to 4/1. When the weight ratio (cyclic polysulfide/sulfur) falls within such a range, the grip performance of the present rubber composition can be kept to a high level for a long time, and the blowout resistance and the abrasion resistance can be improved.

The rubber composition for a tire tread of the present disclosure contains silica in an amount of 90 to 170 parts by weight, and more preferably 100 to 150 parts by weight, based on 100 parts by weight of the styrene-butadiene rubber. When the amount of the silica compounded is less than 90 parts by weight, tan δ (0° C.) is small, and the wet grip performance deteriorates. When the amount of the silica compounded exceeds 170 parts by weight, the rubber strength and rigidity of the rubber composition is reduced. As a result, the abrasion resistance of a tire using the rubber composition is reduced and the steering stability of the tire is reduced.

Further, the present rubber composition may contain another reinforcing filler other than silica. The total amount of the silica and the other reinforcing filler is preferably 90 to 170 parts by weight, and more preferably 100 to 150 parts by weight, based on 100 parts by weight of the styrene-butadiene rubber. When the total amount of the silica and the other reinforcing filler is less than 90 parts by weight, the wet grip performance of the rubber composition deteriorates. When the total amount of the silica and the other reinforcing filler exceeds 170 parts by weight, the abrasion resistance of the rubber composition is reduced and the processability deteriorates. Examples of the other reinforcing filler include carbon black, clay, mica, talc, calcium carbonate, aluminum hydroxide, aluminum oxide, and titanium oxide. Among them, carbon black and clay are preferable.

The silica is not particularly limited as long as it is usually used for the rubber composition for a tire tread. Examples of the silica include wet silica, dry silica, and surface-treated silica.

The rubber composition of the present disclosure may contain a silane coupling agent together with the silica. The silane coupling agent improves the dispersibility of the silica in the rubber composition and enhances the reinforcement with the diene-based rubber. The amount of the silane coupling agent compounded is preferably 2 to 20% by weight, and more preferably 5 to 15% by weight, based on the amount of the silica compounded. When the amount of the silane coupling agent compounded is less than 2% by weight of the amount of the silica, an effect of an improvement in dispersibility of the silica cannot be sufficiently obtained. When the amount of the silane coupling agent compounded exceeds 20% by weight, polymerization between the silane coupling agents occurs. As a result, the desired effect cannot be obtained.

The silane coupling agent is not particularly limited, and is preferably a sulfur-containing silane coupling agent. More specifically, examples of the silane coupling agent include bis(3-triethoxysilylpropyl)tetrasulfide, bis(3-triethoxysilylpropyl)disulfide, 3-trimethoxysilylpropylbenzothiazole tetrasulfide, γ-mercaptopropyltriethoxysilane, and 3-octanoylthiopropyltriethoxysilane. Among them, bis(3-triethoxysilylpropyl)tetrasulfide and bis(3-triethoxysilylpropyl)disulfide are preferable.

The rubber composition for a tire tread of the present disclosure preferably contains an alkyltriethoxysilane having an alkyl group with 7 to 20 carbon atoms. The alkyltriethoxysilane is a silane compound represented by the following formula (II):

[Chemical Formula 3]

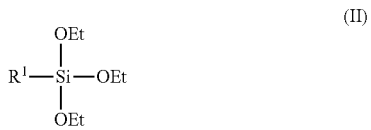

wherein $R^1$ represents an alkyl group having 7 to 20 carbon atoms and OEt represents an ethoxy group.

Specific examples of the alkyl group having 7 to 20 carbon atoms and represented by $R^1$ include a heptyl group, an octyl group, a nonyl group, a decyl group, an undecyl group, and a dodecyl group. Among them, from the viewpoint of compatibility with the diene-based rubber, an alkyl group having 8 to 10 carbon atoms is preferable, and an octyl group and a nonyl group are more preferable.

The rubber composition for a tire tread contains an alkyltriethoxysilane, and thus aggregation of the silica and an increase in viscosity can be suppressed. As a result, a tire having excellent wet performance can be produced. In particular, the alkyltriethoxysilane can suppress an increase in viscosity of the rubber composition and significantly enhance the processability of the rubber composition.

It is considered that such an effect due to addition of an alkyltriethoxysilane occurs because the alkyltriethoxysilane having 7 to 20 carbon atoms promotes reaction (silanization) of the silica with the silane coupling agent to improve the dispersibility of the silica. It is also considered that the alkyltriethoxysilane acts on reaction of the S-SBR1 and S-SBR2 with the silane coupling agent to suppress an increase in viscosity of the rubber composition.

The amount of the alkyltriethoxysilane having 7 to 20 carbon atoms compounded is 0.1 to 20% by mass, preferably 0.5 to 10% by mass, and more preferably 1 to 8% by mass, based on the amount of the silica compounded. When the amount of the alkyltriethoxysilane compounded falls within such a range, an increase in viscosity of the rubber composition can be suppressed. Further, the excellent processability of the rubber composition can be maintained. As a result, the wet grip performance, steering stability, and abrasion resistance of a tire using the rubber composition are maintained to a high level.

The rubber composition for a tire tread may contain various compounding agents which are generally used for a rubber composition for a tire tread. Examples of the compounding agent include a vulcanizing agent or a crosslinking agent, a vulcanization accelerator, an antioxidant, a plasticizer, a processing aid, a liquid polymer, and a thermosetting resin. The compounding agent is kneaded with another component by an ordinary method, and the mixture may be used for vulcanization or crosslinking in the rubber composition. The amount of such a compounding agent compounded can be a conventional general amount compounded as long as the object of the present disclosure is not adversely affected. Thus, the present rubber composition can be produced by mixing the above-described components by using a known kneading machine for rubber, such as a Banbury mixer, a kneader, or a roller.

As described above, the rubber composition for a tire tread of the present disclosure can be suitably applied to a pneumatic tire. The wet grip performance, steering stability, and abrasion resistance of a pneumatic tire with a tread portion made of the rubber composition can be improved as compared with a conventional rubber composition.

The present disclosure will be described in detail by way of examples, but the scope of the present disclosure is not limited to these examples.

EXAMPLES

Twenty-three kinds of rubber compositions for a tire tread (Examples 1 to 10 and Comparative Examples 1 to 13) having compositions shown in Tables 1 to 3 were prepared as follows. That is, in each of the rubber compositions, components other than sulfur, a vulcanization accelerator, and a cyclic polysulfide were kneaded in a 1.8-L hermetic mixer at 160° C. for 5 minutes to prepare a masterbatch. To the masterbatch, sulfur, a vulcanization accelerator, and a cyclic polysulfide were added, and the mixture was kneaded by an open roller to prepare each rubber composition. In SBR containing an oil-extended oil, the net amount of each rubber component compounded is shown in the parentheses of Tables 1 to 3.

The resultant 23 kinds of rubber compositions for a tire tread were each press-vulcanized in a die with a predetermined shape at 160° C. for 20 minutes to prepare each vulcanized rubber sample. Next, rubber hardness, 300% modulus, tensile breaking strength, wet performance (tan δ at 0° C.), and abrasion resistance were evaluated by the methods described below.

Rubber hardness: the rubber hardness of the resultant test piece was measured by a type A durometer at a temperature of 20° C. in accordance with JIS K6253. The obtained results are converted into indices based on the value in Comparative Example 1 defined as 100, and the indices are shown in the rubber hardness (20° C.) section of Tables 1 to 3. A lager index means that the rubber composition has high rubber hardness and excellent mechanical properties, and a pneumatic tire produced by using the rubber composition has excellent steering stability.

Tensile breaking strength and 300% modulus: a JIS No. 3 dumbbell specimen (thickness: 2 mm) was punched out from the resultant test piece in accordance with JIS K6251. The specimen was then subjected to a tensile test under conditions of a temperature of 20° C. and a tensile rate of 500 mm/minute to measure stress at break (tensile breaking strength) and 300% modulus (300% deformation under stress). The obtained results are converted into indices based on the value in Comparative Example 1 defined as 100, and the indices are shown in the breaking strength (20° C.) and 300% Mod (20° C.) sections of Tables 1 to 3. Larger indices mean that the rubber composition has high tensile breaking strength and rigidity and excellent mechanical properties. In addition, the larger indices mean that a pneumatic tire produced by using the rubber composition has excellent abrasion resistance and steering stability.

Wet performance (tan δ at 0° C.): the wet performance of the resultant vulcanized rubber sample was evaluated from loss tangent, tan δ (0° C.), which was the index. The tan δ was measured by a viscoelastic spectrometer manufactured by Toyo Seiki Seisaku-sho, Ltd., under conditions of an initial distortion of 10%, an amplitude of ±2%, a frequency of 20 Hz, and a temperature of 0° C. The obtained results are converted into indices based on the value in Comparative Example 1 defined as 100, and the indices are shown in the tan δ (0° C.) section of Tables 1 to 3. A larger index of tan δ(0° C.) means that the rubber composition has excellent wet grip performance.

Abrasion resistance: the Lambourn abrasion of the resultant vulcanized rubber sample was measured by a Lambourn abrasion tester manufactured by Iwamoto Seisakusho in accordance with JIS K6264-2 under conditions of a temperature of 20° C., a load of 15 N, and a slipping ratio of 50%. The obtained results are converted into indices based on the value in Comparative Example 1 defined as 100, and the indices are shown in the abrasion resistance of Tables 1 to 3. A larger index means that the abrasion resistance of the rubber composition (i.e., a tire) is excellent.

TABLE 1

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| S-SBR1 (part by weight) |  |  |  | 41.3 (30) | 110 (80) | 110 (80) | 110 (80) | 137.5 (100) |
| S-SBR2a (part by weight) |  |  | 137.5 (100) | 96.3 (70) |  |  |  |  |
| S-SBR3 (part by weight) | 137.5 (100) |  |  |  |  |  | 27.5 (20) |  |
| S-SBR4 (part by weight) |  | 137.5 (100) |  |  |  |  | 27.5 (20) |  |
| S-SBR5 (part by weight) |  |  |  |  | 20 |  |  |  |
| Silica (part by weight) | 100 | 100 | 100 | 100 | 100 | 100 | 100 | 100 |
| Carbon black (part by weight) | 5 | 5 | 5 | 5 | 5 | 5 | 5 | 5 |
| Terpene resin 1 (part by weight) | 20 | 20 | 20 | 20 | 20 | 20 | 20 | 0 |
| Oil (part by weight) | 100 | 100 | 100 | 100 | 107.5 | 100 | 100 | 120 |
| Coupling agent (part by weight) | 6.0 | 6.0 | 6.0 | 6.0 | 6.0 | 6.0 | 6.0 | 6.0 |
| Stearic acid (part by weight) | 2.0 | 2.0 | 2.0 | 2.0 | 2.0 | 2.0 | 2.0 | 2.0 |
| Zinc white (part by weight) | 3.0 | 3.0 | 3.0 | 3.0 | 3.0 | 3.0 | 3.0 | 3.0 |
| Sulfur (part by weight) | 2.0 | 2.0 | 2.0 | 2.0 | 2.0 | 2.0 | 2.0 | 2.0 |
| Vulcanizing agent 1 (part by weight) | 0.5 | 0.5 | 0.5 | 0.5 | 0.5 | 0.5 | 0.5 | 0.5 |
| Vulcanizing agent 2 (part by weight) | 3.0 | 3.0 | 3.0 | 3.0 | 3.0 | 3.0 | 3.0 | 3.0 |
| Rubber hardness (20° C.) index | 100 | 118 | 105 | 98 | 106 | 108 | 108 | 100 |
| tan δ (0° C.) index | 100 | 118 | 90 | 92 | 106 | 110 | 125 | 84 |
| 300% Mod (20° C.) index | 100 | 105 | 109 | 105 | 90 | 105 | 110 | 135 |
| Breaking strength (20° C.) index | 100 | 90 | 110 | 108 | 88 | 98 | 90 | 115 |
| Abrasion resistance index | 100 | 85 | 116 | 118 | 104 | 104 | 90 | 125 |

TABLE 2

|  | Comparative Example 9 | Comparative Example 10 | Comparative Example 11 | Comparative Example 12 | Comparative Example 13 | Example 1 | Example 2 | Example 3 |
|---|---|---|---|---|---|---|---|---|
| S-SBR1 (part by weight) |  |  | 137.5 (100) | 137.5 (100) |  | 110 (80) | 137.5 (100) | 137.5 (100) |
| S-SBR2a (part by weight) | 27.5 (20) | 27.5 (20) |  |  |  | 27.5 (20) |  |  |
| S-SBR3 (part by weight) | 110 (80) |  |  |  |  |  |  |  |
| S-SBR4 (part by weight) |  | 110 (80) |  |  |  |  |  |  |
| S-SBR6 (part by weight) |  |  |  |  | 137.5 (100) |  |  |  |
| Silica (part by weight) | 100 | 100 | 80 | 180 | 100 | 100 | 100 | 100 |

TABLE 2-continued

|  | Comparative Example 9 | Comparative Example 10 | Comparative Example 11 | Comparative Example 12 | Comparative Example 13 | Example 1 | Example 2 | Example 3 |
|---|---|---|---|---|---|---|---|---|
| Carbon black (part by weight) | 5 | 5 | 25 | 5 | 5 | 5 | 5 | 5 |
| Terpene resin 1 (part by weight) | 20 | 20 | 20 | 20 | 20 | 20 | 20 |  |
| Terpene resin 2 (part by weight) |  |  |  |  |  |  |  | 20 |
| Oil (part by weight) | 100 | 100 | 100 | 180 | 100 | 100 | 100 | 100 |
| Coupling agent (part by weight) | 6.0 | 6.0 | 4.8 | 10.8 | 6.0 | 6.0 | 6.0 | 6.0 |
| Stearic acid (part by weight) | 2.0 | 2.0 | 2.0 | 2.0 | 2.0 | 2.0 | 2.0 | 2.0 |
| Zinc white (part by weight) | 3.0 | 3.0 | 3.0 | 3.0 | 3.0 | 3.0 | 3.0 | 3.0 |
| Sulfur (part by weight) | 2.0 | 2.0 | 2.0 | 2.0 | 2.0 | 2.0 | 2.0 | 2.0 |
| Vulcanizing agent 1 (part by weight) | 0.5 | 0.5 | 0.5 | 0.5 | 0.5 | 0.5 | 0.5 | 0.5 |
| Vulcanizing agent 2 (part by weight) | 3.0 | 3.0 | 3.0 | 3.0 | 3.0 | 3.0 | 3.0 | 3.0 |
| Rubber hardness (20° C.) index | 102 | 103 | 102 | 110 | 106 | 104 | 108 | 108 |
| tan δ (0° C.) index | 95 | 108 | 80 | 118 | 102 | 102 | 105 | 115 |
| 300% Mod (20° C.) index | 98 | 90 | 100 | 88 | 110 | 133 | 130 | 124 |
| Breaking strength (20° C.) index | 98 | 95 | 100 | 75 | 98 | 114 | 115 | 108 |
| Abrasion resistance index | 94 | 82 | 108 | 76 | 95 | 112 | 104 | 100 |

TABLE 3

|  | Example 4 | Example 5 | Example 6 | Example 7 | Example 8 | Example 9 | Example 10 |
|---|---|---|---|---|---|---|---|
| S-SBR1 (part by weight) | 110 (80) | 137.5 (100) | 137.5 (100) | 137.5 (100) | 137.5 (100) | 137.5 (100) | 137.5 (100) |
| S-SBR2b (part by weight) | 27.5 (20) |  |  |  |  |  |  |
| Silica (part by weight) | 100 | 100 | 100 | 100 | 100 | 40 | 40 |
| Carbon black (part by weight) | 5 | 5 | 5 | 5 | 5 | 80 | 80 |
| Terpene resin 1 (part by weight) | 20 | 20 | 20 | 20 | 20 | 20 | 20 |
| Oil (part by weight) | 100 | 100 | 100 | 100 | 100 | 100 | 100 |
| Cyclic polysulfide 1 (part by weight) |  | 4 |  |  |  |  | 4 |
| Cyclic polysulfide 2 (part by weight) |  |  | 4 |  |  |  |  |
| Coupling agent (part by weight) | 6.0 | 6.0 | 6.0 | 6.0 | 6.0 | 6.0 | 6.0 |
| Alkylsilane (part by weight) |  |  |  | 2.0 | 8.0 |  | 2.0 |
| Stearic acid (part by weight) | 2.0 | 2.0 | 2.0 | 2.0 | 2.0 | 2.0 | 2.0 |
| Zinc white (part by weight) | 3.0 | 3.0 | 3.0 | 3.0 | 3.0 | 3.0 | 3.0 |
| Sulfur (part by weight) | 2.0 | 0.5 | 0.5 | 2.0 | 2.0 | 2.0 | 0.5 |
| Vulcanizing agent 1 (part by weight) | 0.5 | 0.5 | 0.5 | 0.5 | 0.5 | 0.5 | 0.5 |
| Vulcanizing agent 2 (part by weight) | 3.0 | 3.0 | 3.0 | 3.0 | 3.0 | 3.0 | 3.0 |
| Rubber hardness (20° C.) index | 105 | 108 | 108 | 104 | 101 | 104 | 105 |
| tan δ (0° C.) index | 101 | 105 | 105 | 115 | 125 | 105 | 105 |
| 300% Mod (20° C.) index | 128 | 131 | 132 | 118 | 110 | 135 | 125 |
| Breaking strength (20° C.) index | 119 | 118 | 119 | 110 | 108 | 112 | 115 |
| Abrasion resistance index | 115 | 115 | 118 | 108 | 112 | 125 | 138 |

Types of raw materials used in Tables 1 to 3 will be described below.

S-SBR1: solution-polymerized styrene-butadiene rubber (TUFDENE E680 available from Asahi Kasei Chemicals Corporation)

An oil-extended product having a styrene content of 36% by weight, a vinyl content of 64% by weight, an Mw of 1,470,000, a Tg of −13° C., and an oil component of 37.5 parts by weight based on 100 parts by weight of rubber component.

S-SBR2a: solution-polymerized styrene-butadiene rubber (TUFDENE E581 available from Asahi Kasei Chemicals Corporation)

An oil-extended product having a styrene content of 37% by weight, a vinyl content of 42% by weight, an Mw of 1,260,000, a Tg of −27° C., and an oil component of 37.5 parts by weight based on 100 parts by weight of rubber component.

S-SBR3: solution-polymerized styrene-butadiene rubber (NS460 available from ZEON CORPORATION)

An oil-extended product having a styrene content of 27% by weight, a vinyl content of 69% by weight, an Mw of 780,000, a Tg of −18° C., and an oil component of 37.5 parts by weight based on 100 parts by weight of rubber component.

S-SBR4: solution-polymerized styrene-butadiene rubber (NS462 available from ZEON CORPORATION)

An oil-extended product having a styrene content of 47% by weight, a vinyl content of 52% by weight, an Mw of 660,000, a Tg of −6° C., and an oil component of 37.5 parts by weight based on 100 parts by weight of rubber component.

S-SBR5: solution-polymerized styrene-butadiene rubber (NS616 available from ZEON CORPORATION)

An non-oil-extended product having a styrene content of 23% by weight, a vinyl content of 70% by weight, an Mw of 490,000, and a Tg of −23° C.

S-SBR6: solution-polymerized styrene-butadiene rubber (HP755B available from JSR Corporation)

An oil-extended product having a styrene content of 41% by weight, a vinyl content of 41% by weight, an Mw of 1,160,000, a Tg of −19° C., and an oil component of 37.5 parts by weight based on 100 parts by weight of rubber component.

S-SBR2b: solution-polymerized styrene-butadiene rubber (SLR6430 available from The Dow Chemical Company)

An oil-extended product having a styrene content of 41% by weight, a vinyl content of 25% by weight, an Mw of 1,010,000, a Tg of −30° C., and an oil component of 37.5 parts by weight based on 100 parts by weight of rubber component.

Oil: Extract No. 4S available from SHOWA SHELL SEKIYU K.K.

Silica: Zeosil 1165MP available from Rhodia.

Carbon black: SEAST 9 available from Tokai Carbon Co., Ltd., $N_2SA=142$ $m^2/g$). Terpene resin 1: YS resin TO-85 available from YASUHARA CHEMICAL CO., LTD.

An aromatic modified terpene resin having a softening point of 85° C.

Terpene resin 2: YS resin TO-125 available from YASUHARA CHEMICAL CO., LTD.

An aromatic modified terpene resin having a softening point of 125° C.

Cyclic polysulfide 1: cyclic polysulfide represented by the formula (I), wherein R is $(CH_2)_2O(CH_2)_2$, x is 4 on the average, and n is 2 to 3. This cyclic polysulfide 1 was prepared as follows.

To toluene (500 g), 1.98 g of 1,2-dichloroethane (0.02 mol) and 1197 g of an aqueous solution of 30% sodium polysulfide ($Na_2S_4$) (2 mol) were added. To the mixture, 0.64 g of tetrabutylammonium bromide (0.1 mol) was then added and the mixture was allowed to react at 50° C. for 2 hours. Subsequently, the reaction temperature was raised to 90° C. A solution prepared by dissolving 311 g of dichloroethyl formal (1.8 mol) in 300 g of toluene was added dropwise to the reaction solution over 1 hour, and the mixture was allowed to react for another 5 hours. After completion of the reaction, the organic layer was separated and concentrated at 90° C. under reduced pressure to obtain 405 g (yield: 96.9%) of the cyclic polysulfide described above.

Cyclic polysulfide 2: cyclic polysulfide represented by the formula (I), wherein R is $(CH_2)_6$, X is 4 on the average, and n is 1 to 4. This cyclic polysulfide 2 was prepared as follows.

In a three-necked flask equipped with a condenser and a thermometer, 8 g (0.102 mol) of anhydrous sodium sulfide, 9.8 g (0.306 mol) of sulfur, and 50 g of tetrahydrofuran (THF) were placed under a nitrogen atmosphere, and the mixture was allowed to react at 80° C. for 1 hour. A solution of 15.5 g (0.10 mol) of 1,6-dichlorohexane in 20 g of THF was added dropwise to the reaction mixture at 80° C. for 2 hours, and the mixture was allowed to react at the same temperature for 2 hours. After completion of the reaction, a salt in the organic phase was removed by filtration, and the organic phase was concentrated at 90° C. under reduced pressure. As a result, 20.2 g (yield: 95%) of a product was obtained as the cyclic polysulfide 2 having the above-discussed configuration.

Coupling agent: bis(3-triethoxysilylpropyl)tetrasulfide, Si69 (available from Evonik Degussa)

Alkyl silane: octyltriethoxysilane, KBE-3083 available from Shin-Etsu Chemical Co., Ltd.

Stearic acid: Beads stearic acid YR available from NOF Corporation

Zinc white: Zinc Oxide #3 available from SEIDO CHEMICAL INDUSTRY CO., LTD.

Sulfur: Golden Flower Oil Treated Sulfur Powder available from Tsurumi Chemical Industry Co., Ltd.

Vulcanization accelerator 1: vulcanization accelerator DPG, NOCCELER D available from Ouchi Shinko Chemical Industrial Co., Ltd.

Vulcanization accelerator 2: vulcanization accelerator CBS, NOCCELER CZ-G available from Ouchi Shinko Chemical Industrial Co., Ltd.

As is clear from Tables 2 and 3, it was confirmed that the rubber compositions for a tire tread in Examples 1 to 10 had excellent steering stability (rubber hardness (20° C.), 300% modulus (20° C.), and tensile breaking strength (20° C.)), wet grip performance (tan δ at 0° C.), and abrasion resistance, as compared with those in Comparative Examples.

As is clear from Table 1, the rubber composition in Comparative Example 2 contains S-SBR4 having a styrene content of more than 38% by weight, a vinyl content of less than 60% by weight, and an Mw of less than 1,000,000, as compared with those in examples. Therefore, the tensile breaking strength (20° C.) and abrasion resistance of the rubber composition in Comparative Example 2 are inferior. The rubber composition in Comparative Example 3 does not contain S-SBR1, but contains only S-SBR2a of the present disclosure. Therefore, the wet grip performance (tan δ at 0° C.) of the rubber composition in Comparative Example 3 is inferior to the rubber compositions in Examples. Further, in the rubber composition in Comparative Example 4, the amount of the S-SBR1 compounded is less than 40% by weight, and therefore, the rubber hardness (20° C.) and wet grip performance (tan δ at 0° C.) of the rubber composition in Comparative Example 4 are inferior.

The rubber composition in Comparative Example 5 does not contain S-SBR2, but contains S-SBR5 of the present disclosure, the S-SBR5 having an Mw of less than 1,000,000. Therefore, the tensile breaking strength (20° C.) and 300% modulus (20° C.) of the rubber composition in Comparative Example 5 are inferior to the rubber compositions in Examples. The rubber compositions in Comparative Examples 6 and 7 do not contain S-SBR2, but contain S-SBR3 and S-SBR4 of the present disclosure, the S-SBR3 and S-SBR4 having an Mw of less than 1,000,000 and Tg being higher than −20° C. Therefore, the tensile breaking strength (20° C.) of the rubber composition in each of Comparative Examples 6 and 7 is inferior to the rubber compositions in Examples. The rubber composition in Comparative Example 8 does not contain an aromatic modified terpene resin. Therefore, the wet grip performance (tan δ at 0° C.) of the rubber composition in Comparative Example 8 is inferior to the rubber compositions in Examples.

As is clear from Table 2, the rubber composition in Comparative Example 9 does not contain S-SBR1, but contains S-SBR3 of the present disclosure, the S-SBR3 having a styrene content of less than 30% by weight and an Mw of less than 1,000,000. Therefore, the wet grip performance (tan δ at 0° C.), tensile breaking strength (20° C.), 300% modulus (20° C.), and abrasion resistance of the rubber composition in Comparative Example 9 are inferior to the rubber compositions in Examples. The rubber composition in Comparative Example 10 does not contain S-SBR1, but contains S-SBR4 of the present disclosure, the S-SBR4 having a styrene content of more than 38% by weight, a vinyl content of less than 60% by weight, and an Mw of less than 1,000,000. Therefore, the 300% modulus (20° C.), tensile breaking strength (20°

C.), and abrasion resistance of the rubber composition in Comparative Example 10 are inferior to the rubber compositions in Examples. The rubber composition in Comparative Example 11 contains silica in an amount of less than 90 parts by weight. Therefore, the wet grip performance (tan δ at 0° C.) of the rubber composition in Comparative Example 11 is inferior to the rubber compositions in Examples. The rubber composition in Comparative Example 12 contains silica in an amount of more than 170 parts by weight. Therefore, the tensile breaking strength (20° C.), 300% modulus (20° C.), and abrasion resistance of the rubber composition in Comparative Example 12 are inferior to the rubber compositions in Examples.

The rubber composition in Comparative Example 13 contains S-SBR6 having a styrene content of more than 38% by weight and a vinyl content of less than 60% by weight. Therefore, the tensile breaking strength (20° C.) and abrasion resistance of the rubber composition in Comparative Example 13 are inferior to the rubber compositions in Examples.

As described above, the rubber composition for a tire tread according to one aspect of the present disclosure is a rubber composition obtained by compounding 100 parts by weight of styrene-butadiene rubber, which includes 40 to 100% by weight of solution-polymerized styrene-butadiene rubber S-SBR1 and 60 to 0% by weight of solution-polymerized styrene-butadiene rubber S-SBR2, the total content thereof being 100% by weight, with 90 to 170 parts by weight of silica, and 10 to 30 parts by weight of aromatic modified terpene resin, wherein the S-SBR1 has a styrene content of 30 to 38% by weight, a vinyl content of 60 to 80% by weight, a glass transition temperature of −20 to −5° C., and a weight average molecular weight of 1,000,000 to 1,800,000, and the S-SBR2 has a glass transition temperature of −30° C. or higher and lower than −20° C. and a weight average molecular weight of 1,000,000 to 1,800,000.

The softening point of the aromatic modified terpene resin is preferably 80° C. or higher and lower than 100° C.

Since the rubber composition for a tire tread according to one aspect of the present disclosure has such a configuration, the wet grip performance, steering stability, and abrasion resistance are further improved as compared with a conventional rubber composition.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A tire tread composition comprising:
   100 parts by weight of rubber compounds,
   90 to 170 parts by weight of silica, and
   10 to 30 parts by weight of an aromatic modified terpene resin,
   wherein all of the rubber compounds in said tire tread composition consist of 40 to 100% by weight of solution-polymerized styrene-butadiene rubber (S-SBR1) and 60 to 0% by weight of solution-polymerized styrene-butadiene rubber (S-SBR2), the total content thereof being 100% by weight,
   the S-SBR1 has a styrene content of 30 to 38% by weight and a vinyl content of 60 to 80% by weight, the total content thereof being 100% by weight, a glass transition temperature of −20 to −5° C., and a weight average molecular weight of 1,000,000 to 1,800,000, and
   the S-SBR2 has a glass transition temperature of −30° C. or higher and lower than −20° C., and a weight average molecular weight of 1,000,000 to 1,800,000.

2. The tire tread composition according to claim 1, wherein the aromatic modified terpene resin has a softening point of 80° C. or higher and lower than 100° C.

3. The tire tread composition according to claim 1, wherein the aromatic modified terpene resin is a styrene-modified terpene resin.

4. The tire tread composition according to claim 1, wherein the aromatic modified terpene resin has a hydroxyl value in a range of 0 to 25 KOH mg/g.

5. The tire tread composition according to claim 1, further comprising a cyclic polysulfide represented by the following formula (I) in an amount of 0.2 to 5 parts by weight based on 100 parts by weight of the styrene-butadiene rubber:

(I)

wherein R is a substituted or unsubstituted alkylene group having 4 to 8 carbon atoms, or a substituted or unsubstituted oxyalkylene group having 4 to 8 carbon atoms, x is 3 to 5 on the average, and n is an integer of 1 to 5.

6. The tire tread composition for according to claim 5, wherein the cyclic polysulfide is used as a vulcanizing agent together with another vulcanizing agent.

7. The tire tread composition according to claim 6, wherein the other vulcanizing agent is sulfur.

8. The tire tread composition for according to claim 1, wherein 2 to 20% by weight of a silane coupling agent and 0.1 to 20% by weight of an alkyltriethoxysilane having an alkyl group with 7 to 20 carbon atoms are compounded based on the amount of the silica compounded.

9. The tire tread composition according to claim 8, wherein the silane coupling agent is a sulfur-containing silane coupling agent.

10. The tire tread composition according to claim 8, wherein the silane coupling agent is bis(3-triethoxysilylpropyl)tetrasulfide or bis(3-triethoxysilylpropyl)disufide.

11. The tire tread composition according to claim 8, wherein the alkyltriethoxysilane is a silane compound represented by the following formula (II):

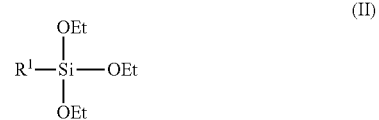

(II)

wherein $R^1$ represents an alkyl group having 7 to 20 carbon atoms and OEt represents an ethoxy group.

12. The tire tread composition according to claim 11, wherein the alkyl group is selected from the group consisting of a heptyl group, an octyl group, a nonyl group, a decyl group, an undecyl group, and a dodecyl group.

13. A pneumatic tire comprising the tire tread composition according to claim 1.

14. The tire tread composition according to claim 1, wherein all of the rubber compounds in said tire tread composition consist of 70 to 100% by weight of solution-polymerized styrene-butadiene rubber (S-SBR1) and 30 to 0% by weight of solution-polymerized styrene-butadiene rubber (S-SBR2), the total content thereof being 100% by weight.

15. The tire tread composition according to claim 1, wherein all of the rubber compounds in said tire tread composition consist of 75 to 100% by weight of solution-polymerized styrene-butadiene rubber (S-SBR1) and 25 to 0% by weight of solution-polymerized styrene-butadiene rubber (S-SBR2), the total content thereof being 100% by weight.

16. The tire tread composition according to claim 1, wherein the tire tread composition comprises 100 to 150 parts by weight of silica.

17. The tire tread composition according to claim 1, wherein the tire tread composition comprises 12 to 25 parts by weight of an aromatic modified terpene resin.

18. The tire tread composition according to claim 1, wherein the S-SBR1 has a styrene content of 32 to 37% by weight and a vinyl content of 62 to 70% by weight, a total content thereof being 100% by weight, a glass transition temperature of −18 to −7° C., and a weight average molecular weight of 1,200,000 to 1,600,000; and the S-SBR2 has a glass transition temperature of −28° C. or higher and lower than −22° C., and a weight average molecular weight of 1,100,000 to 1,500,000.

19. The tire tread composition according to claim 1, wherein 5 to 15% by weight of the silane coupling agent and 1 to 8% by weight of the alkyltriethoxysilane having an alkyl group with 7 to 20 carbon atoms are compounded based on the amount of the silica compounded.

20. The tire tread composition according to claim 1, wherein all of the rubber compounds in said tire tread composition consist of the S-SBR1.

* * * * *